United States Patent
Ueda et al.

(10) Patent No.: US 7,805,689 B2
(45) Date of Patent: Sep. 28, 2010

(54) CIRCUIT BOARD INFORMATION ACQUISITION AND CONVERSION METHOD, PROGRAM, AND DEVICE FOR THE SAME

(75) Inventors: Akira Ueda, Kawasaki (JP); Hideharu Matsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

(21) Appl. No.: 11/675,304

(22) Filed: Feb. 15, 2007

(65) Prior Publication Data

US 2008/0082947 A1 Apr. 3, 2008

(30) Foreign Application Priority Data

Sep. 29, 2006 (JP) .............................. 2006-269359

(51) Int. Cl.
  *G06F 17/50* (2006.01)
(52) U.S. Cl. ...................... 716/3; 716/4; 716/8; 716/15
(58) Field of Classification Search ...................... 716/4, 716/15, 3, 8
  See application file for complete search history.

(56) References Cited

U.S. PATENT DOCUMENTS

| 2006/0101367 A1 | 5/2006 | Fujita et al. | |
| 2008/0072182 A1* | 3/2008 | He et al. | 716/2 |
| 2009/0030660 A1* | 1/2009 | Celik et al. | 703/2 |

FOREIGN PATENT DOCUMENTS

| JP | 2005-216017 | 8/2005 |
| JP | 2006-135152 | 5/2006 |
| JP | 2006-216017 | 8/2006 |

OTHER PUBLICATIONS

European Office Action issued on Dec. 5, 2008 in corresponding European Patent Application 07 102 445.9.
T.Y. Lee, "An Investigation of Thermal Enhancement on Flip Chip Plastic BGA Packages Using CFD Tool", IEEE Transactions on Components and Packaging Technologies, vol. 23, No. 3, Sep. 2000, pp. 481-489.
L. Shang et al., "Thermal Modeling, Characterization and Management of On-chip Networks", Proceedings of the 37th International Symposium on Microarchitecture, Dec. 2004, pp. 67-78.
W. Huang et al. "Compact Thermal Modeling for Temperature-Aware Design", Proceedings of the Design Automation Conference, Jun. 2004, pp. 878-883.
F. Sarvar et al. "Effective Modeling of the Reflow Soldering Process: Basis, Construction, and Operation of a Process Model" IEEE Transactions on Components, Packaging, and Manufacturing Technology-Part C: Manufacturing, vol. 21, No. 2, Apr. 1998, pp. 126-133.

(Continued)

*Primary Examiner*—Paul Dinh
*Assistant Examiner*—Patrick Sandoval
(74) *Attorney, Agent, or Firm*—Staas & Halsey LLP

(57) ABSTRACT

A circuit information acquisition and conversion device, a method, and a program therefor for acquiring a layer configuration, wire traces and shapes of via holes from circuit board design information; optimizing, before conversion into an analysis model, the output target range of the via holes on the basis of a package area, heat density distribution, and power consumption; and creating an analysis model that is suitable for a purpose of the analysis are provided.

17 Claims, 13 Drawing Sheets

OTHER PUBLICATIONS

Extended European Search Report issued in corresponding European Patent Application No. 07102445.9-2224, on Jun. 12, 2007.

Chinese Office Action issued on Jul. 31, 2009 in corresponding Chinese Patent Application No. 200710086074.1.

* cited by examiner

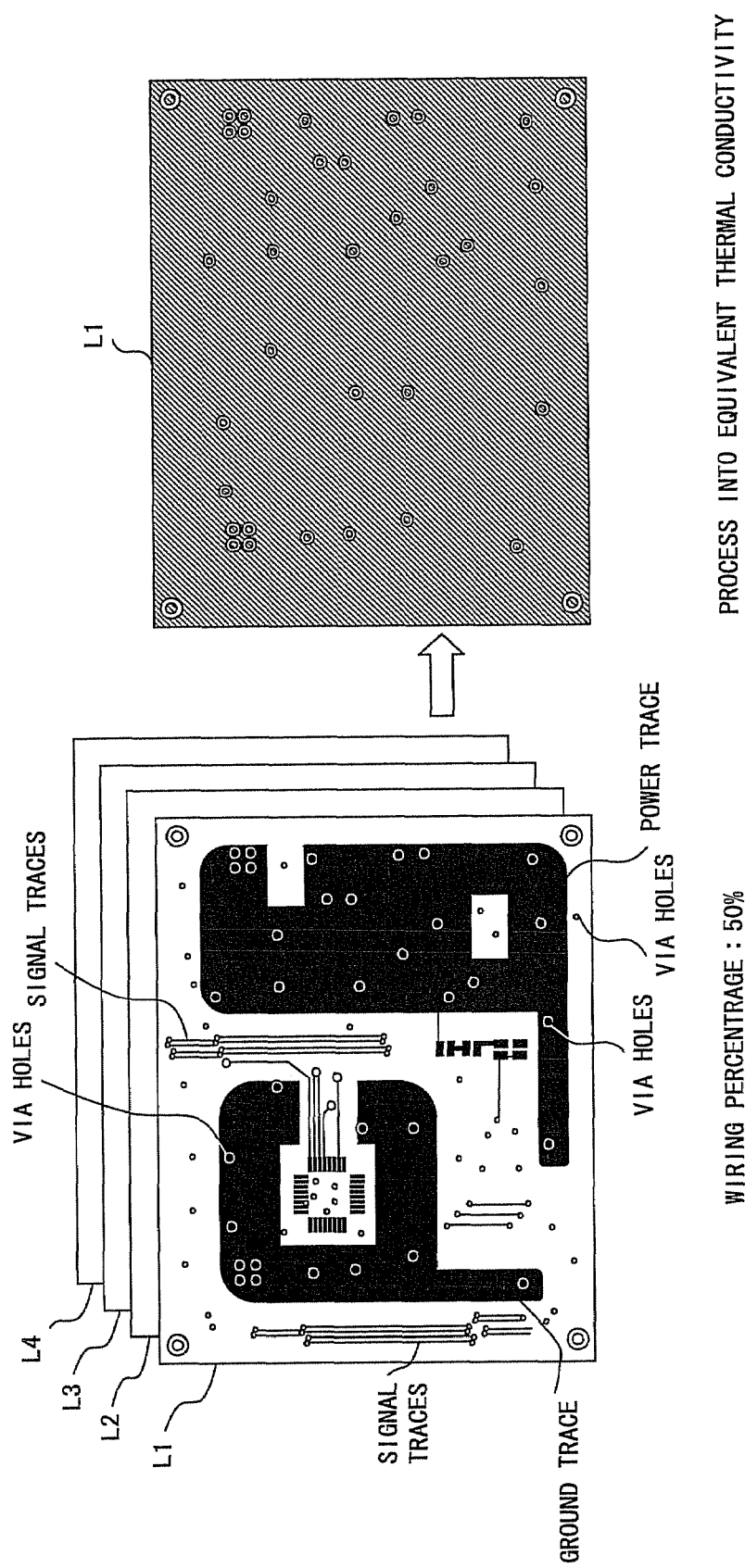
F I G. 3

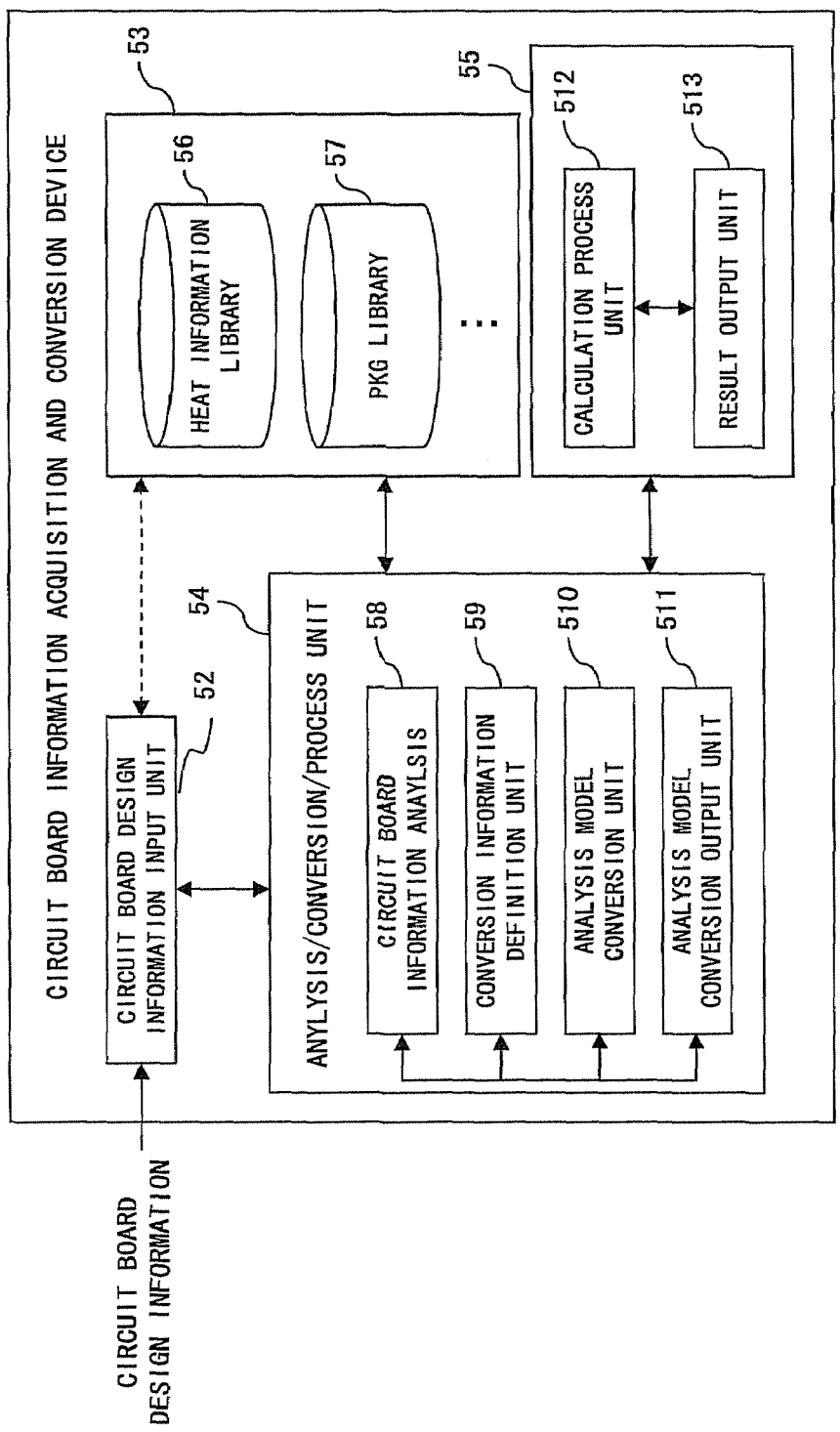
F I G. 5

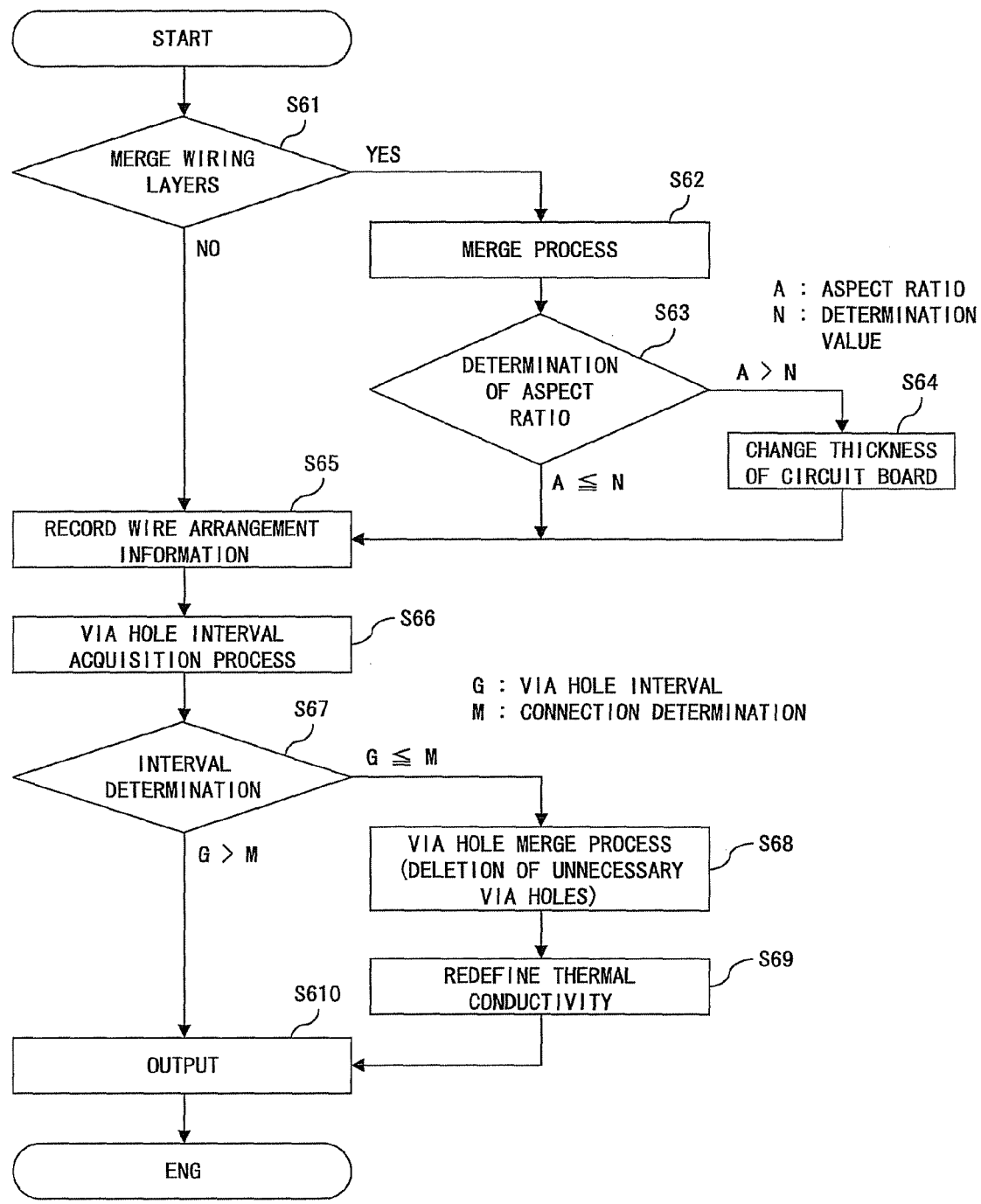
F I G. 6

CIRCUIT BOARD INFORMATION ACQUISITION AND CONVERSION METHOD, PROGRAM, AND DEVICE FOR THE SAME

BACKGROUND OF THE INVENTION

1. Field of the Invention

The present invention relates to the conversion of circuit board information used for supporting the thermal design of circuit boards, and particularly to a technique of improving the accuracy of thermal analysis.

2. Description of the Related Art

In recent years, simulations and the production of prototypes have been repeatedly performed for calculating the thermal influence of heat sources because heat sources on circuit boards have a great influence on the thermal design of the entire circuit board in circuit board (such as multilayer printed circuit boards that are mounting boards on which LSI package boards are mounted, and the like) design. Thus, various types of simulation systems and programs for supporting the thermal design of circuit boards have been developed.

In thermal design, detailing heat dissipation paths is important in order to improve the accuracy of the thermal analysis (using the finite volume method or the like) of circuit boards. In particular, under the condition of the self-cooled configuration, heat dissipation occurs mainly to the side of circuit boards; accordingly, modeling in which wiring on boards, via holes and the like are taken into consideration is required.

As one of several conventional techniques, information on layer configuration, wire traces, shapes of via holes, and the like is used for the modeling on the basis of intermediate files (IGES, or Initial Graphics Exchange Specification) of output data from CAD (Computer Aided Design) tools and STEP (Standard for the Exchange of Product model data).

However, when the modeling is performed in detail, by using the conventional thermal analysis models as above, on the basis of circuit board design information such as the layer configuration, the wire traces, and the shapes of via holes, the scale of the analysis model becomes great, and a longer time is required for the calculation.

In order to reduce the scale of analysis, simplified modeling is performed by defining equivalent thermal conductivity on the basis of the wiring percentage of copper (Cu), and by defining via holes or the like by the anisotropic thermal conductivity. However, although the scale of modeling is made smaller and the time required for the calculation is shortened, the analysis accuracy deteriorates because the heat dissipation paths are simplified if the definitions are based on the equivalent thermal conductivity and the anisotropic thermal conductivity.

According to Patent Document 1, when conducting heat designing, information included in the respective layers in a multilayer printed circuit board, such as wire traces, through holes, heat sources, resin and the like, is acquired by using a data file in the format of a two-dimensional CAD, and the operator makes the simulation model closer to the actual circuit board by selecting the information necessary for the thermal design simulation, such as the materials, dimensions and the like. Thereafter, the simulation model is created on the basis of the added information. This method suggests the creation of a simulation model that allows the accurate calculation of heat influence when a simulation is performed for the thermal design on multilayer printed circuit boards.

However, Patent Document 1 discloses the method in which the operator selects an appropriate setting for improving the accuracy of the thermal design simulation, but does not disclose the method of automatically simplifying simulation models, shortening the time required for calculation, or improving the accuracy of analysis.

According to Patent Document 2, antenna effects and errors such as errors against timing limitations are analyzed in an error analysis step on the layout data that includes redundant via holes, and it is determined whether or not there is an error, and the number of via holes from among the via holes on the signal wire that have a design limitation violation that are required to be reconfigured as single via holes in order to avoid the design limitation violation is calculated in the error determination step, and in the via hole conversion step, the erroneous redundant via holes are reconfigured as the single via holes on the basis of the calculation result. The suggestion has been made to arrange as many redundant via holes as possible while avoiding design limitation violations such as errors against the antenna effects, the timing limitations, and the like that are caused by the conversion from the single via holes into the redundant via holes in order to improve the yield.

However, Patent Document 2 discloses the technique of arranging via holes on the actual board, and does not disclose the technique of creating analysis models used for the thermal design. Accordingly, it is impossible to simplify the analysis models, to shorten the time for the analysis, or to improve the analysis accuracy on the basis of the technique disclosed in Patent Document 2.

Patent Document 1
   Japanese Patent Application Publication No. 2005-216017

Patent Document 2
   Japanese Patent Application Publication No. 2006-135152

SUMMARY OF THE INVENTION

The present invention is achieved in view of the above situation, and it is an object of the present invention to provide a circuit board information acquisition and conversion device, a method and a program therefor by which layer configurations, wire traces, the shapes of via holes and the like are acquired from circuit board design information, the target ranges of the output of via holes are optimized, and analysis models suitable for the purposes of analysis are created on the basis of package dimensions, heat density distribution, consumed power and the like before conversion into the analysis models.

The method of the present invention comprises:
a circuit board design information acquisition process for acquiring circuit board design information having information of heat propagation paths in a circuit board;
a process for performing merger determination of whether or not the heat propagation paths are to be merged on the basis of the circuit board design information; and
an analysis model conversion process for merging the heat propagation paths on the basis of the circuit board design information and a result of the merger determination, converting the physical property value of the merged heat propagation paths into an equivalent value for the physical property of the heat propagation paths before being merged, and creating a thermal analysis model.

Desirably, circuit board design information having layer configuration information, wire trace information, and via holes information of the circuit board is acquired in the circuit board design information acquisition process;
distances between the via holes are calculated on the basis of the via holes information, the calculation result is compared with a connection determination value that is beforehand set in a memory unit, and when the distance between the via holes is within a certain range of the connection determination value, merger determination is performed for whether or not the plurality of via holes within the range are merged in the conversion information definition process; and the via holes are merged on the basis of the circuit board design information and the result of the merger determination, the physical property value of the merged via holes is converted into an equivalent value for the physical property of the plurality of via holes before being merged, and a thermal analysis model is created in the analysis model conversion process.

Desirably, the merger determination is performed by setting ranges of the connection determination value for each of the same layer in the circuit board.

Desirably, the merger determination is performed by setting ranges of the connection determination value for each layer in the circuit board.

Desirably, the method of the present invention comprises:

a circuit board design information analysis process for acquiring package information and heat information corresponding to mounted components in mounted component information included in the circuit board design information; and a heat density determination process for beforehand setting a heat density determination value, calculating heat density from the heat amount of each of the mounted components, comparing calculated heat density with the heat density determination value, changing circuit board design information in such a manner that the via holes are arranged within a range that is equal to or greater than the heat density determination value, and deciding not to arrange the via holes when the calculation result is out of the range of the heat density determination value.

Desirably, a region is set in the analysis model circuit board, a heat density determination value is set beforehand, heat density is calculated from heat amount for each of the mounted components, the calculated heat density is compared with the heat density determination value, circuit board design information is changed in such a manner that via holes are arranged in the region when the calculated result is within the range of the heat density determination value, and via holes are not arranged in the region when the calculated result is out of the range of the heat density determination value.

Desirably, the physical property of the analysis model conversion process is thermal conductivity.

Desirably, resin and wire traces are merged on the basis of the layer configuration information and the information of wire traces in the circuit board design information, and conversion into an equivalent value of the resin before being merged and into an equivalent value of the wire traces before being merged is performed in the analysis model conversion process.

An aspect of the present invention employs a configuration comprising:

a circuit board design information input unit for acquiring circuit board design information having layer configuration information, wire trace information, and via holes information of a circuit board;

a conversion information definition unit for calculating distances between the via holes on the basis of the via holes information, comparing a calculation result with a connection determination value that is set beforehand in a memory unit, and performing merger determination of whether or not the plurality of via holes within a range are merged when the distance between the via holes is within the range of the connection determination value; and an analysis model conversion unit for merging the via holes on the basis of the circuit board design information and the result of the merger determination, converting the physical property value of the merged via holes into an equivalent value of the physical property of the plurality of via holes before being merged, and creating a thermal analysis model.

Desirably, the conversion information definition unit performs the merger determination by setting ranges of the connection determination value for each of the same layer in the circuit board.

Desirably, the conversion information definition unit performs the merger determination by setting ranges of the connection determination value for each layer in the circuit board.

Desirably, the present invention comprises:

a circuit board design information analysis unit for acquiring package information and heat information corresponding to mounted components in mounted component information included in the circuit board design information; and a heat density determination unit for beforehand setting a heat density determination value, calculating heat density from the heat amount of each of the mounted components, comparing calculated heat density with the heat density determination value, changing circuit board design information in such a manner that the via holes are arranged in a range that is equal to or greater than the heat density determination value, and deciding not to arrange the via holes when the calculation result is out of the range of the heat density determination value.

Desirably, the heat density determination unit sets a region in the analysis model circuit board, sets a heat density determination value, calculates heat density from heat amount for each of the mounted components, compares the calculated heat density with the heat density determination value, changes circuit board design information in such a manner that via holes are arranged in the region when the calculated result is within the range of the heat density determination value, and does not arrange via holes in the region when the calculated result is out of the range of the heat density determination value.

Desirably, the physical property of the analysis model conversion process is thermal conductivity.

Desirably, the analysis model conversion unit merges resin and wire traces on the basis of the layer configuration information and the information of wire traces in the circuit board design information, and performs conversion into an equivalent value of the resin before being merged and into an equivalent value of the wire traces before being merged.

The present invention relates to a recording medium in which a circuit board information acquisition and conversion program is recorded and from which the program can be read by a computer that performs circuit board information acquisition and the conversion of acquired circuit board design information having layer configuration information, wire trace information, and via holes information of a circuit board, causing the computer to execute:

a conversion information definition process for calculating distances between the via holes on the basis of the via holes information, comparing a calculation result with a connection determination value that is beforehand set in a memory unit, and performing merger determination of whether or not the plurality of via holes within a range are merged when the distance between the via holes is within the range of the connection determination value; and an analysis model conversion process for merging the via holes on the basis of the circuit board design information and the result of the merger determination, converting the physical property value of the merged via holes into an equivalent value of a physical property of the plurality of via holes before being merged, and creating a thermal analysis model.

Desirably, the merger determination is performed by setting ranges of the connection determination value for each of the same layer in the circuit board in the conversion information definition process.

Desirably, the merger determination is performed by setting ranges of the connection determination value for each layer in the circuit board in the conversion information definition process.

Desirably, the computer is caused to execute the circuit board information acquisition and conversion program, including:

a circuit board design information analysis process for acquiring package information and heat information corresponding to mounted components in mounted component information included in the circuit board design information; and a heat density determination process for beforehand setting a heat density determination value, calculating heat density from the heat amount of each of the mounted components, comparing calculated heat density with the heat density determination value, changing circuit board design information in such a manner that the via holes are arranged in a region where the calculation result is within a range that is equal to or greater than the heat density determination value, and deciding not to arrange the via holes when the calculation result is out of the range decided by the heat density determination value.

Desirably, the computer is caused to execute the circuit board information acquisition and conversion program, including:

a heat density determination process for setting a region on the analysis model circuit board, beforehand setting a heat density determination value, calculating heat density from the heat amount of each of the mounted components, comparing calculated heat density with the heat density determination value, changing circuit board design information in such a manner that the via holes are arranged in the region where the calculated heat density is within the range of the heat density determination value, and deciding not to arrange the via holes when the calculation result is out of the range of the heat density determination value.

Desirably, the physical property of the analysis model conversion process is thermal conductivity.

According to the present invention, it is possible to reduce the scale of the thermal analysis model. Also, by improving the accuracy of the thermal analysis, the optimum thermal design can be conducted on the actual circuit board. It is possible to improve the efficiency of the design of circuit boards, and to improve the quality of circuit boards.

BRIEF DESCRIPTION OF THE DRAWINGS

FIG. 3 shows wire traces;

FIG. 5 is a block diagram showing a configuration of a circuit board information acquisition and conversion device;

FIG. 6 shows the operation flow of via hole connection determination and simplification (merging and deleting process);

DESCRIPTION OF THE PREFERRED EMBODIMENTS

Figure 1:
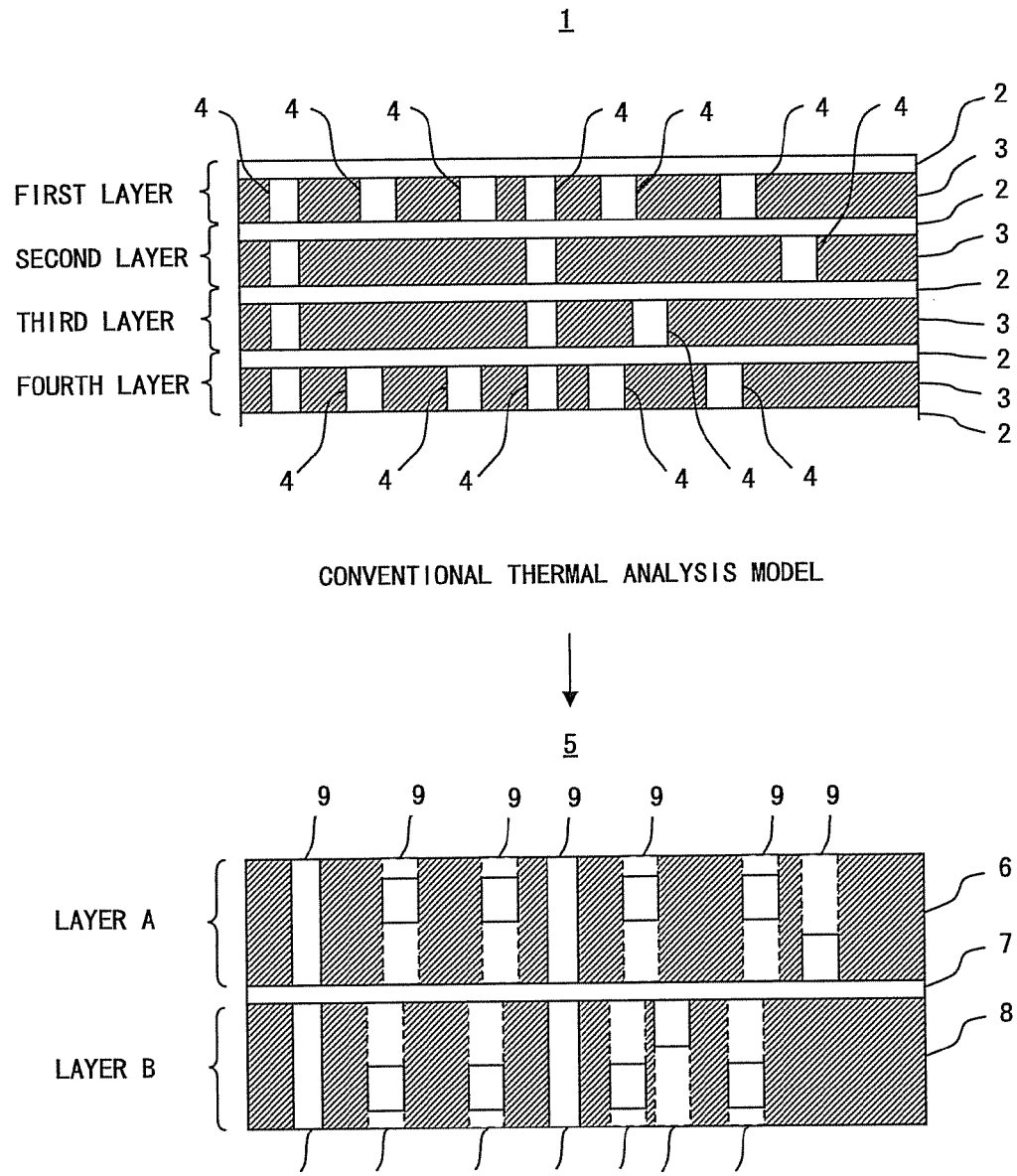
FIG. 1 shows comparing a cross section of a thermal analysis model of a conventional circuit board with the same of the present invention.

The present invention relates to improvement of the efficiency of thermal analysis on circuit boards by using conventional circuit diagram editors, CAD tools, PCB (Printed Circuit Board) tools, simulation tools and the like, or to performing the thermal analysis efficiently by using the above tools incorporated into EDA (Electronic Design Automation) tools.

Hereinafter, embodiments of the present invention are explained in detail by referring to the drawings.

(Principles)

FIG. 1 shows a cross section of a thermal analysis model 1 of a circuit board. The thermal analysis model 1 is created when the thermal analysis is performed on the circuit board (a detailed thermal analysis model or a conventional thermal analysis model). The thermal analysis model 1 shown in FIG. 1 is output from the CAD tools or the like, and is created by acquiring circuit board design information (information about heat propagation paths: mounted component information, layer configuration information, wiring information, via holes information and the like) from IGES, STEP and the like. Also, the thermal analysis model 1 is created by defining the equivalent thermal conductivity on the basis of the wiring percentage of wire traces and wire materials (copper (Cu)) and the like, and defining via holes and the like on the basis of anisotropic thermal conductivity.

The thermal analysis model 1 shown in FIG. 1 is a multilayer printed circuit board (first through fourth layers in the present example) including wire traces 2 (including power supply traces, ground traces, signal traces, leads, pads and the like) and resin 3 (layer configuration information). The wires between the respective layers are connected to one another by via holes 4 (through holes and the like) (wiring information) Heat sources such as ICs are mounted on component sides or on solder sides of an actual circuit board (mounted component information).

The shape and arrangement of the constituent elements of the above thermal analysis model 1 directly reflect the respective constituent elements of the multilayer printed circuit board that is actually being designed.

The analysis model 5 shown in FIG. 1 is a thermal analysis model in which the circuit board design information is simplified, without a deterioration in accuracy, by using a circuit board information acquisition and conversion method (a circuit board design information acquisition process, a conversion information definition process, and an analysis model conversion process) according to the present invention.

First, it is determined whether or not heat propagation paths are to be merged in the conversion information definition process. The circuit board design information acquisition process includes the acquisition of, for example, circuit board layer configuration information, wire trace information, and via holes information or the like. Next, distances between via holes are calculated on the basis of via information (via hole dimensions, positions, thermal conductivities and the like). The calculated distance is compared with a connection determination value that is set beforehand in a memory unit, and when the distances between the via holes are within the connection determination value, it is determined whether or not a plurality of via holes located within the range of the connection determination value are to be merged in the conversion information definition process. Thereafter, in the analysis model conversion process, the heat propagation paths are merged on the basis of the result of the above merge determination, and the physical property value of the merged heat propagation paths is converted into an equivalent value of the physical property of the heat propagation paths before being merged, and the thermal analysis model is created. As an example of the above, via holes are merged on the basis of the circuit board design information and the result of the merge determination, the physical property value of the merged via holes is converted into an equivalent value of the plurality of via holes before being merged, and the analysis model conversion process of creating the thermal analysis model is performed.

Figure 2:
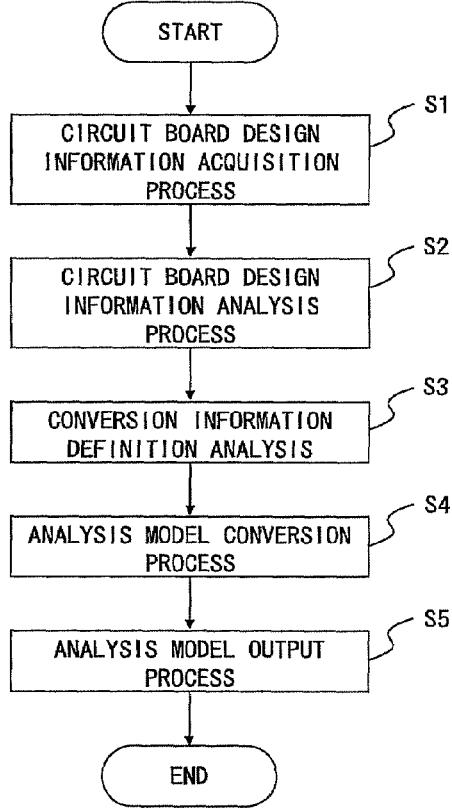
FIG. 2 is a flowchart showing the principle of the present invention.
Figure 2:
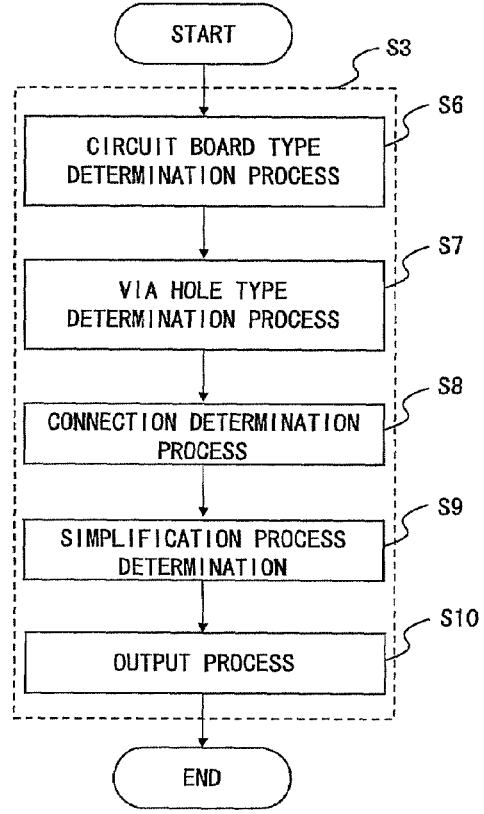

The conversion in which the thermal analysis model is simplified is explained by referring to the flowchart shown in FIG. 2.

In step S1, the circuit board design information (circuit board design data) is input. This information is created on the basis of a circuit diagram data or the like that the operator inputs when designing the circuit board. Examples of the circuit board design information herein include an intermediate file created by, e.g., a CAD tool.

In step S2, the circuit board design information analysis process is performed. The circuit board design information created in step S1 is acquired, and the package sizes of the components to be mounted and the heat source information of the respective components to be mounted are acquired. The information acquired is not limited to the package size or heat source information, and information required for the thermal analysis may be acquired additionally.

In step S3, the conversion information definition process is performed (steps S6 through S10 in FIG. 2).

In step S6, the type of the circuit board (rigid/flexible circuit board, IVH (Inner Via Hole) circuit board, build-up circuit board, or the like) is determined on the basis of the circuit board design information, and the determined type is recorded. Alternatively, this determination of the type of circuit boards may be performed by the operator.

In step S7, it is determined whether the via holes are formed on the signal trace, the power trace, or the ground trace. Then, the determination result is recorded. Generally, signal traces have a width narrower than that of the power traces or the ground traces. Also, heat from heat sources such as ICs or the like is not likely to be conducted to the signal traces. In contrast, heat is easily conducted from heat sources to the power traces and the ground traces because they are arranged, in order to supply power, in the vicinity of the power source unit (such as a DC/DC converter or the like), and are directly connected to such a unit. Also, they are often connected over a very wide area in order to facilitate heat dissipation and to eliminate noise. By handling the signal traces and the grand traces/power traces separately as described above, the determination is performed in which the model is simplified by reducing the number of via holes of the signal traces that do not have great influence on the analysis. In this configuration, when some of the via holes on the signal traces are required for the analysis, the operator can select and use them for the analysis.

In step S8, the thermal conductivity of the wire traces 2 (copper (Cu) for example) on the wiring layer in the analysis model 1 shown in FIG. 1 is converted into the equivalent physical property value for the detailed structure of the wire traces.

As an example, the figure shown in FIG. 3 shows the wire traces on the first through fourth layers shown in FIG. 1. On the first layer (L1) in FIG. 3, the signal traces, the power trace, the ground trace, and the via holes are formed. When the wiring percentage to the board dimensions is 50% (Cu), and the thermal conductivity is 400 W/m·° C., the first layer is simplified on the basis of the assumption of 400 W/m·° C.×0.5 (50%)=200 W/m·° C. as the equivalent thermal conductivity. In this method, the physical properties of all the layers (L1 through L4) are converted into the physical properties having the equivalent thermal conductivity of the detailed structure.

Further, the total of the thicknesses of the respective layers (first layer through fourth layer) of the detailed structure is used as the standard thickness of the wiring layer. However, when the aspect ratio of the computational mesh that will be described later becomes a problem, the thickness is doubled or tripled, for example. However, this alteration is made in such a way that the thermal conductivities are equivalent. Also, an adjustment is made so as not to deteriorate the quality of the mesh.

Figure 4:
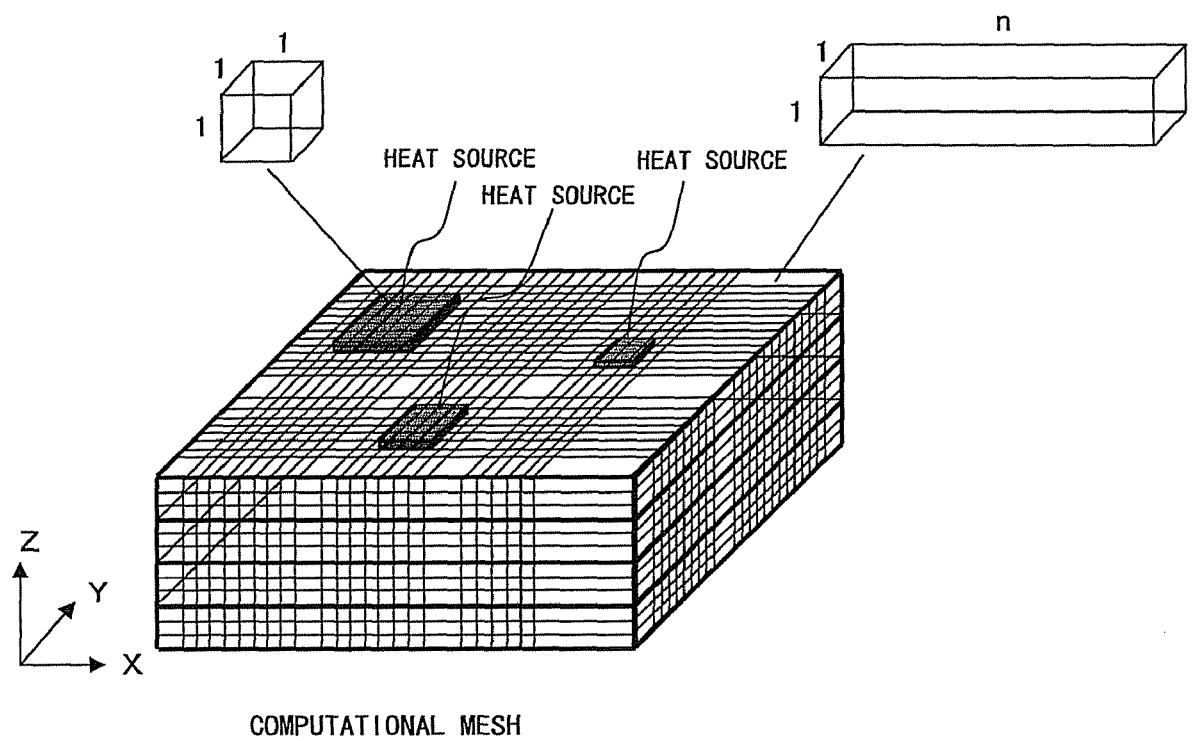
FIG. 4 shows a computational mesh.

Specifically, the mesh ideally has a three-dimensional aspect ratio of 1:1:1 (X, Y, Z directions), as shown in FIG. 4; however, in the analysis, while the aspect ratios on the spots in the vicinities of the heat sources are set to 1:1:1, all of the values included in the aspect ratios on the spots which are not in the vicinities of the heat sources are set to be different from one another in order to simplify the calculation. For example, these aspect ratios are set to 1:1:n. Therefore, the thickness is, for example, doubled or tripled on the basis of the difference between the respective values in the aspect ratios in order to make the thermal conductivities equivalent.

Also, when changing into the equivalent physical property value, the thermal conductivities of the elements other than those of the via holes are converted together with the physical property values of the wire traces 2 and the resin 3, taking them into consideration. In another words, the resin 3 and the wire traces 2 of the first and second layers in FIG. 1 are combined and converted into the layer "A" 6, and the resin 3 in the third layer and the resin 3 and the wire traces 2 in the fourth layer are combined and converted into the layer "B" 8. Then, the wire traces 2 in the third layer are the same as the wire traces 7 in the thermal analysis model 5. It is also possible to select the method in which the wiring layers are not modeled.

In step S9, via holes that can be merged are determined and recorded.

When, for example, if there are via holes within a prescribed range on one and the same layer, the merge process is performed, and the number of via holes is reduced. When there is not a via hole that has influence on the thermal analysis within a prescribed range on the same layer, the layer is deleted. By such a determination process, the via hole shape modification determination for reducing the number of via holes is performed.

Also, when there are via holes on the half side from the middle horizontal line of the board, the merge process is performed to combine the via holes, and the number of via holes is reduced.

In step S10, the recorded results in the above steps S6 through 10 are output to step S4.

In step S4, the analysis models and the like are created in order to simplify the circuit board design information on the basis of the results of steps S2 and S3 above.

In step S5, the thermal analysis model is output.

By the above processes, it is possible to reduce the scale of the thermal analysis model. Also, by improving the accuracy of the thermal analysis, the optimum thermal design can be conducted on the actual circuit board. It is possible to improve the efficiency of the design of circuit boards, and to improve the quality of circuit boards.

Also, the above circuit board information acquisition and conversion process can be realized as software, i.e., as a program executed by a computer (CPU or the like), for electronic devices. Alternatively, the circuit board information acquisition and conversion process can be realized as hardware. Further, the circuit board information acquisition and conversion process can be realized as firmware that is software fixedly incorporated into CPUs or the like in electronic devices and the like.

EXAMPLE 1

FIG. 5 is a block diagram showing a configuration of the circuit board information acquisition and conversion device.

A circuit board information acquisition and conversion device 51 includes a circuit board design information input unit 52, a library 53, an analysis/conversion/process unit 54, and a simulation unit 55.

The circuit board design information input unit 52 acquires circuit board design information (circuit board design data) generated on the basis of circuit diagram data input by an operator when designing a circuit board. Thereafter, the circuit board design information is transferred to the analysis/conversion/process unit 54. In this configuration, it is also possible to acquire necessary information from the library 53 because in some cases wire traces or via hole shape is not included in the circuit board design information.

The library 53 is a memory. In the library 53, property information corresponding to information of the respective components (mounted component information, names of manufacturers, type reference numbers, names of products (resistors, capacitors, ICs . . . )) recorded in, for example, a hard disk. The property information is recorded in a sublibrary such as a heat information library 56, a package (PKG) library 57 or the like, and is associated with the component information. The above configuration includes the sublibrary in this example; however, the scope of the present invention is not limited to this configuration.

As the heat information, information such as the amount of heat generated by a target IC when being driven is recorded. Also, the amount of heat for each use condition can be recorded because the amount of power consumed when being driven varies depending on clock frequencies, such as in the case of using a CPU. As the package information, the dimensions of components are recorded.

The analysis/conversion/process unit 54 comprises a circuit board information analysis process unit 58, a conversion information definition unit 59, an analysis model conversion unit 510, and an analysis model conversion output unit 511.

The circuit board information analysis process unit 58 acquires, on the basis of the mounted component information in the circuit board design information, heat information of the respective component mounted on the circuit board that is to be designed and the package information from the heat information library 56 and the package (PKG) library 57 in the library 53. It is also possible to employ the configuration in which the operator inputs the heat information and the package information when the target component is not included in the library 53.

The conversion information definition unit 59 selects the board that is to be the target. The conversion information definition unit 59 determines whether the circuit board is a rigid/flexible circuit board, an IVH (Inner Via Hole) circuit board, a build-up circuit board, or the like on the basis of, for example, the circuit board type information, and records the determination result. The conversion information definition unit 59 also determines whether the via hole is a via hole that is formed on a wire trace or a via hole that forms a power trace or a ground trace, and records the determination result. The conversion information definition unit 59 also performs the conversion into the physical property value that is equivalent to a thermal conductivity of the detailed structure, and adds the thicknesses of the respective wiring layers of the detailed structure. When the aspect ratio of the computational mesh that will be described later becomes a problem, the thickness is doubled or tripled in order to make the thermal conductivity equivalent for avoiding deterioration of the computational mesh, and the obtained value is recorded. Also, the method in which the wiring layers are not modeled is also selected. In this case, the thermal conductivities of the components other than those of the via holes can be changed to the physical property values about which the "resin+wire traces" is take into consideration. Also, the via holes that can be merged are determined and the determination result is recorded.

The analysis model conversion unit 510 creates the thermal analysis model on the basis of the results obtained from the circuit board information analysis process unit 58 and the conversion information definition unit 59. Then, the created thermal analysis model is transferred to the simulation unit 55 through the analysis model conversion output unit 511.

The simulation unit 55 performs the simulation by using a calculation process unit 512 on the basis of the thermal analysis model, and outputs the simulation result from a result process unit 513 (temperatures at the respective points are graphically represented by using values and drawings, for example).

(Explanations of Operations)

FIG. 6 is a flowchart showing the connection determination and simplification (merging process and deletion process) of the via holes performed by the conversion information definition unit 59.

In step S61, it is determined whether or not the wiring layers can be merged. When the analysis model is simple, wiring is not simplified, and the process proceeds to step S65 for recording the circuit board design information. When the merge process is performed, the process proceeds to step S62.

It is also possible to merge the wiring layers on the basis of a selection made by the operator.

In step S62, the merge process is performed. The wiring percentage with respect to the board area of each layer and the thermal conductivity of the wire traces comprising the power traces, the ground traces, and the via holes are acquired from the fundamental design information. The equivalent thermal conductivity is calculated on the basis of the wiring percentage and the thermal conductivity. The obtained values are changed into the physical property values that are equivalent to the thermal conductivities in the detailed structure for all the layers.

Also, upon conversion into the equivalent physical property values, the thermal conductivities of the components other than those of the via holes are converted together with the resin and wire traces, which are both taken into consideration in the conversion of these thermal conductivities. It is also possible to select the method in which the wiring layers are not modeled.

In step S63, the determination of the aspect ratios is performed. The total of the thickness of the respective layers of the detailed structure is acquired from the circuit board design information.

Thereafter, it is determined whether the board design information sets the mesh ratios in the vicinities of the heat sources to 1:1:1, and sets the aspect ratios of the spots other than those in the vicinities of the heat sources to other than 1:1:1 in order to simplify the analysis. The aspect ratio determination value "N" (X (width)×Y (length)×Z (height)=volume "N") that is beforehand recorded in the memory and the volume calculated on the basis of the aspect ratio included in the fundamental design information are compared with each other.

When the result satisfies the relationship of "A>N", the process proceeds to step S64. When "A≦N", the process proceeds to step S65. In the case where, for example, the aspect ratio determination value N=1, and the aspect ratio calculated from the fundamental information has the volume of 1 (width)×5 (length)×1 (height)=5, the process proceeds to step S64.

In the above configuration, the aspect ratio is not necessarily 1:1:1, and the scope of the present invention is not limited to this value.

In step S64, the thickness of the board acquired from the fundamental design information is changed. By doubling or tripling the thickness, for example, the thermal conductivity is made to be equivalent.

In step S65, the results obtained in the above steps s61 through s64 are recorded as the wire arrangement information.

In step S66, a via hole interval acquisition process is performed. The via hole interval acquisition process is acquired from the information specifying the positions of via holes (via hole arrangement information). The via hole arrangement information specifies positions on the board at which via holes are arranged in the three-dimensional manner (X, Y, and Z).

In step s67, the distance G between the via holes is calculated on the basis of the connection determination value M that is beforehand set for each via hole on the above via arrangement information and of the via arrangement information acquired from the circuit board design information, and the connection determination value M and the distance G are compared with each other. When the result satisfies the relationship of "G≦M", the process proceeds to step S68. When the result is "G>M", the process proceeds to step s610.

Figure 7:
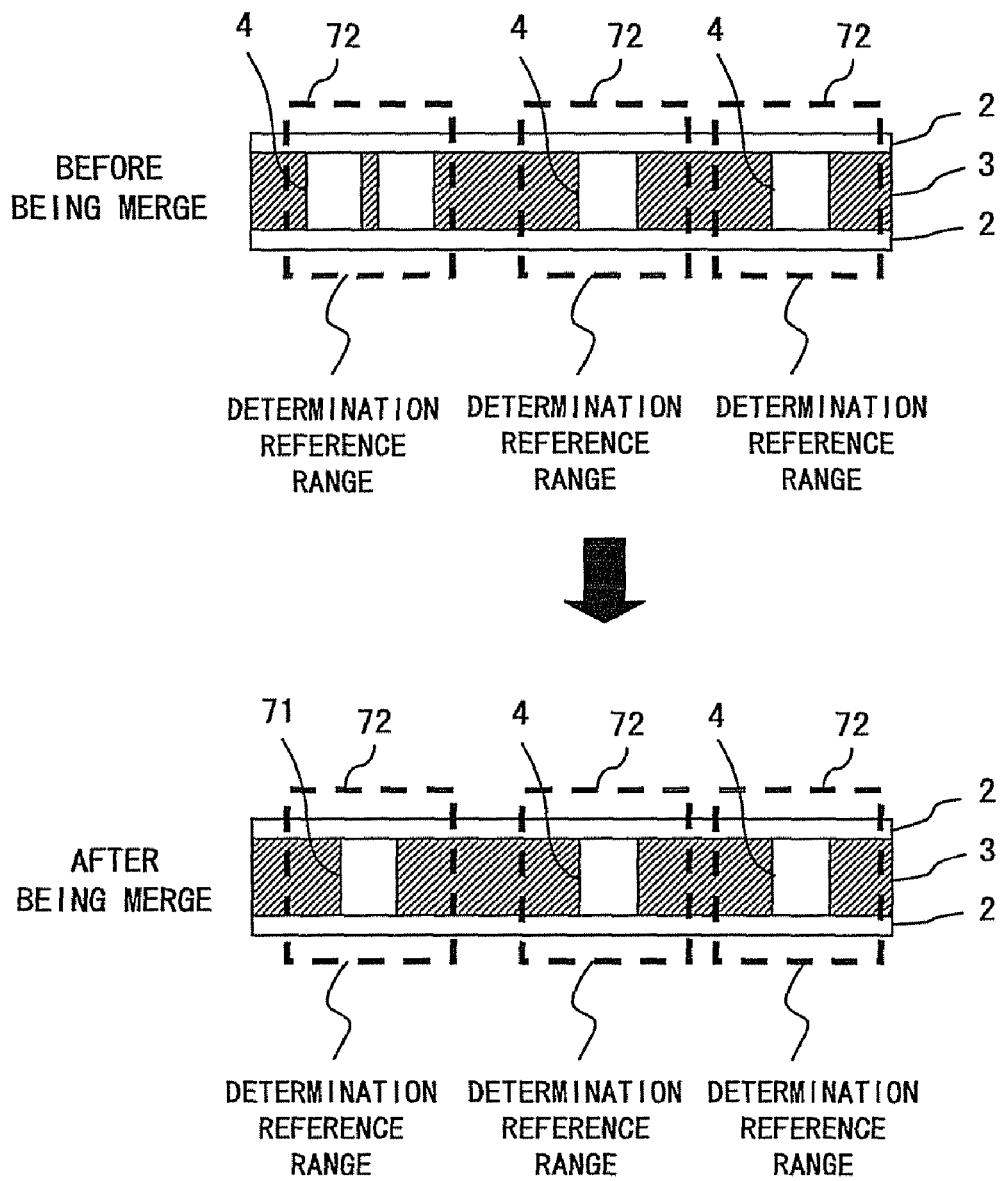
FIG. 7 shows determination reference areas on the same layer and a configuration after merging.

When there are via holes in a range on the same layer (determination reference range), the merge process is performed, and the number of via holes is reduced. When, for example, the distance between the via holes is within the prescribed determination reference range as shown in FIG. 7, the via holes are merged. In FIG. 7, two via holes 4 after being merged are again merged into via holes 71.

Figure 8:
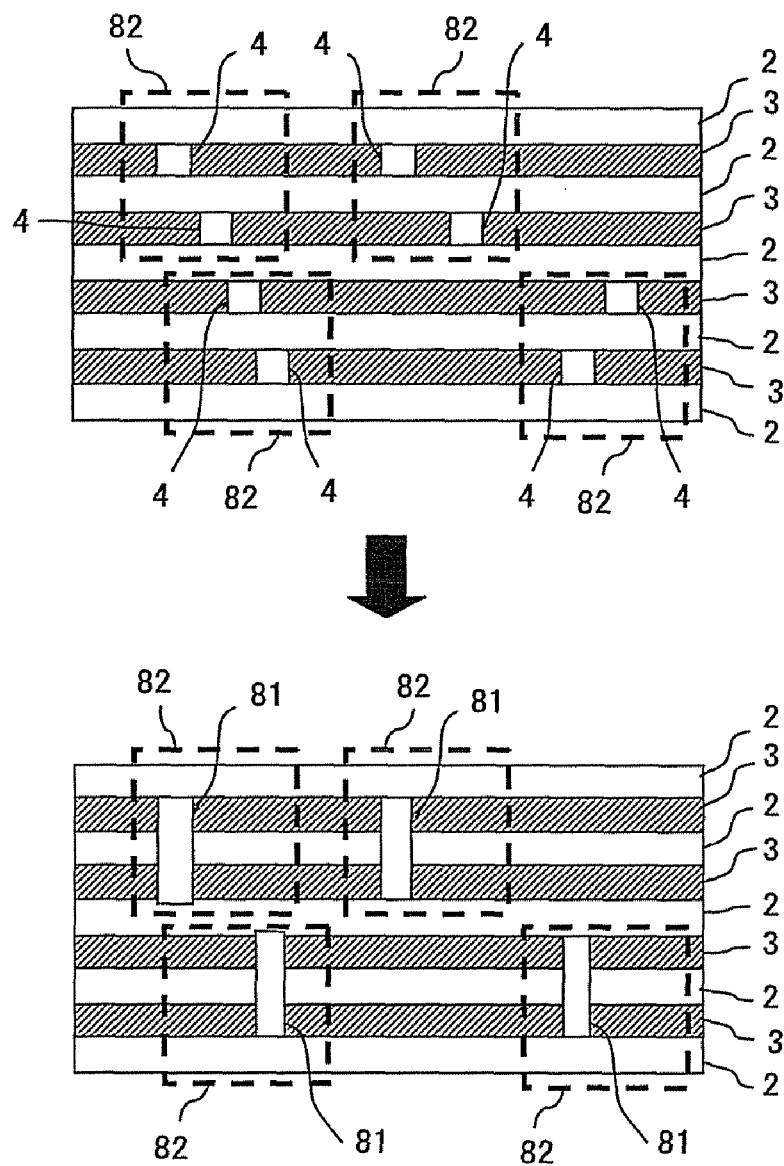
FIG. 8 shows determination reference areas on a layer and a configuration after merging.

Also, when the via holes on the half side from the middle horizontal line of the board are within a particular range (determination reference range) as shown in FIG. 8, the merge process is performed, and the via holes are connected; thereby, the number of via holes is reduced. In FIG. 8, two via holes 4 after being merged are again merged into via holes 81.

The determination reference range (0.5 mm, 1.0 mm, or 2.0 mm, for example) is recorded in the memory in advance to be used for extracting the via that can be merged. Also, when there is not a via hole within a range on the same layer, the deletion process is performed, and the number of via holes is reduced.

In step s68, the merge process is performed on the basis of the result of step s67, and the merge arrangement information in the circuit board design information is changed.

In step s69, the thermal conductivity is redefined. When via holes are merged, the thermal conductivity is converted into the equivalent thermal conductivity so that the thermal propagations are equal. Specifically, the thermal conductivity in the merge arrangement in the circuit board design information is changed.

In step S610, the converted circuit board design information is output.

EXAMPLE 2

Next, simplification of a circuit board on the basis of heat density will be explained.

Figure 9:
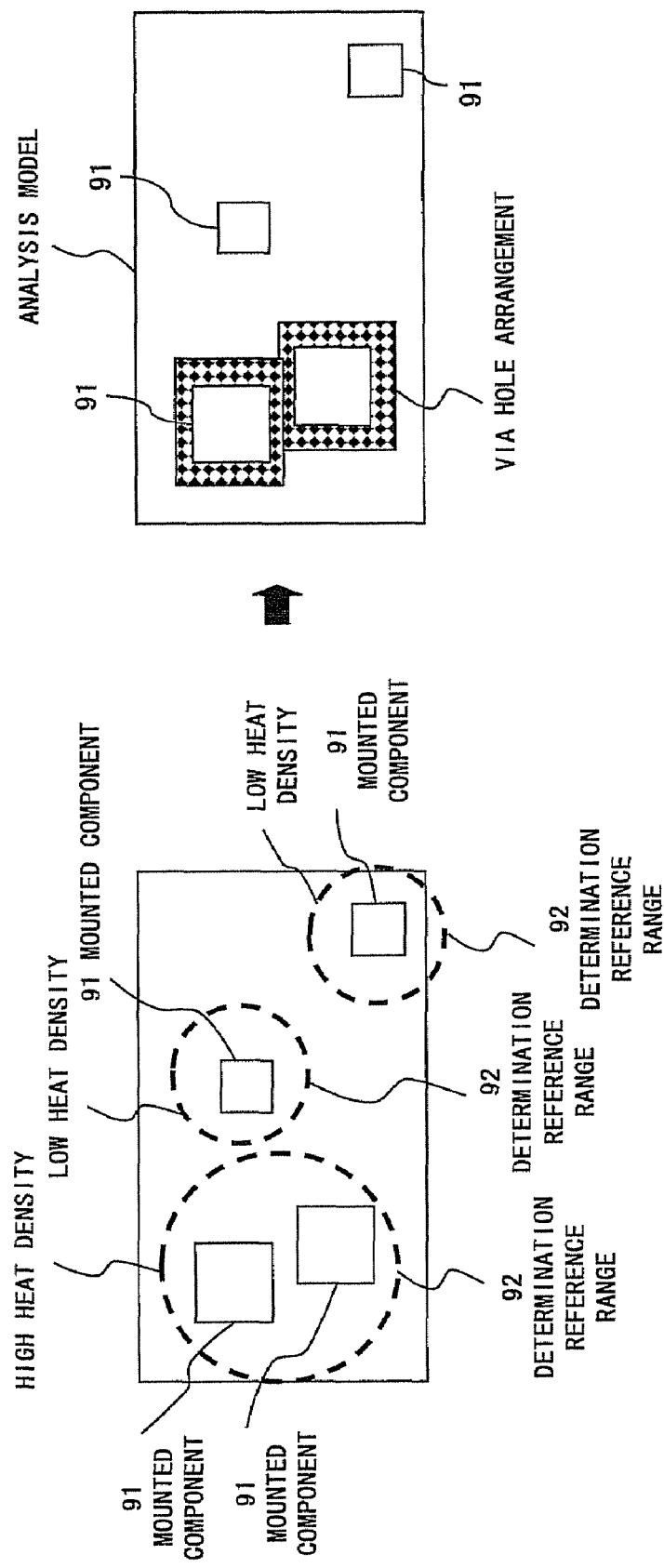
FIG. 9 shows an example in which the via holes are modeled, with respect to the mounted components having the heat density with which the components are vulnerable to heat, as an analysis model on the basis of the heat density calculated from the area of the package and on the amount of heat.

FIG. 9 shows an example in which the via holes are modeled, with respect to the mounted components having the heat density with which the components are vulnerable to heat, as an analysis model on the basis of the heat density calculated from the area of the package and on the amount of heat.

The analysis/conversion/process unit 54 additionally includes a heat density determination unit, and the prescribed heat density determinant value is recorded in the memory (library 53 or the like).

On the basis of the amount of heat for each mounted component, the heat density determination unit calculates the heat density that influences the vicinities of the components on the circuit board. The calculated heat density and the heat density determination value are compared with each other, and the circuit board information is changed in such a manner that via holes are arranged in the areas enclosed by the dotted lines (determination reference range) in FIG. 9 when the calculated heat density is equal to or greater than the heat density determination value (having a greater amount of heat). Also, if the heat density of the package in the areas enclosed by the dotted lines in FIG. 9 is not within the range of the heat density determination value, a via hole is not output. The above processes can be realized as the control program of a computer (CPU) to be processed by the computer (heat density determination process).

In this configuration, it is also possible to calculate and compare the respective heat densities of the mesh included in the circuit board design information. It is also possible to prepare a mesh for the heat density determination for calculating the heat density.

The heat density determination unit does not necessarily have to be provided to the analysis/conversion/process unit 54.

Also, the processes in example 2 may be performed after the simplification of example 1.

Thereby, it is possible to the reduce scale of analysis models. Also, by improving analysis accuracy, appropriate thermal design for circuit boards is realized. Efficiency in designing circuit boards and quality of the circuit boards are improved.

EXAMPLE 3

In example 3, the heat density distribution of an analysis model is traced from the circuit board design information, via holes are arranged on regions having great heat densities or having extreme differences in heat densities, and via holes are not arranged on the other regions.

Figure 10:
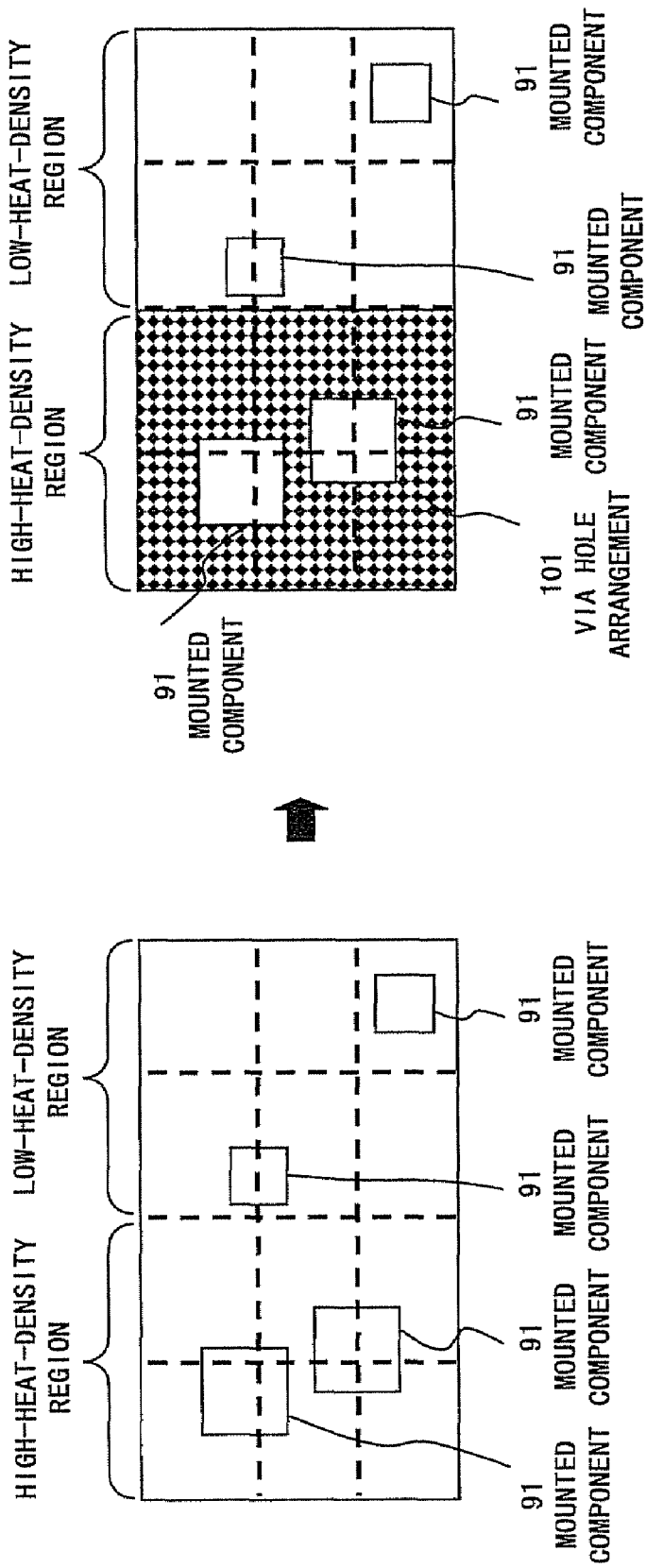
FIG. 10 shows an example of an arrangement of via holes in a region having great heat density or an extreme heat density difference.

The heat density determination unit for calculating the heat density is provided similarly to example 2. Further, a region setting unit is provided to the analysis/conversion/process unit 54 and the like, and the region as shown in FIG. 10 is determined (region setting process). The region is divided as represented by the dashed lines on the board. In the present example, the region is square, but the scope of the present invention is not limited to this shape. Also, the region can by determined on the basis of selection by the operator.

In each region, the heat density that was calculated by the heat density determination unit and the heat density determination value are compared with each other, and when the calculated heat density is equal to or greater than the heat density determination value (high heat density region), the circuit board design information is changed so that via holes are arranged in the region (determination reference range).

Also, the difference between the heat density in the region calculated by the heat density determination unit and the heat density determination value is calculated, and the circuit board design information is changed in such a manner that the via holes are arranged if the difference is equal to or greater than an inside-region heat density difference determination value that is beforehand recorded in the memory. The above processes can be realized as the control program of a computer (CPU) to be processed by the computer.

Also, the processes in example 3 may be performed after the simplification of example 1.

Thereby, it is possible to reduce the scale of analysis models. Also, by improving analysis accuracy, appropriate thermal design for circuit boards is realized. Efficiency in designing circuit boards and the quality of the circuit boards are improved.

Additionally, when the amount of heat and the package area exceed the vulnerable condition in view of heat, the circuit board design information may be changed in such a manner that via holes are arranged.

EXAMPLE 4

Figure 11:
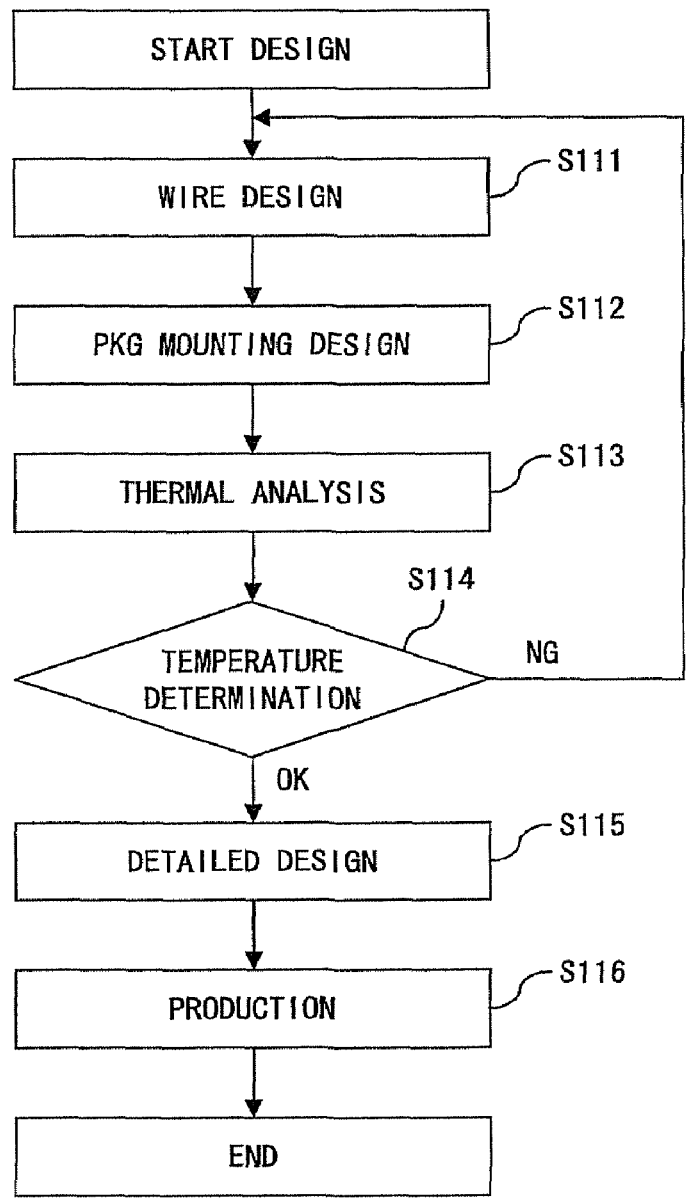
FIG. 11 shows a flow of the production.

FIG. 11 shows the flowchart used for production.

In step S111, circuit design is performed. For example, the specifications of the device are considered, an architecture is designed, and circuit functions are determined and assigned to the PCB or the LSI.

In step S112, package mounting design is performed, and a layer configuration and wire traces are determined. In addition to logic design, timing design, waveform analysis, mounting design, thermal design, layout design, and power consumption analysis are performed.

In step S113, thermal analysis is performed on the basis of the above described examples.

In step S114, a temperature is determined on the basis of the results of the thermal analysis in step S113. When there is no problem, detailed design is performed in step S115.

In step S116, a circuit board that is used for an analysis model creation device or the like for electronic devices, automobiles, thermal hydraulic material, structure, electromagnetic wave analysis, mounting boards, or a PKG circuit board is produced.

Figure 12:
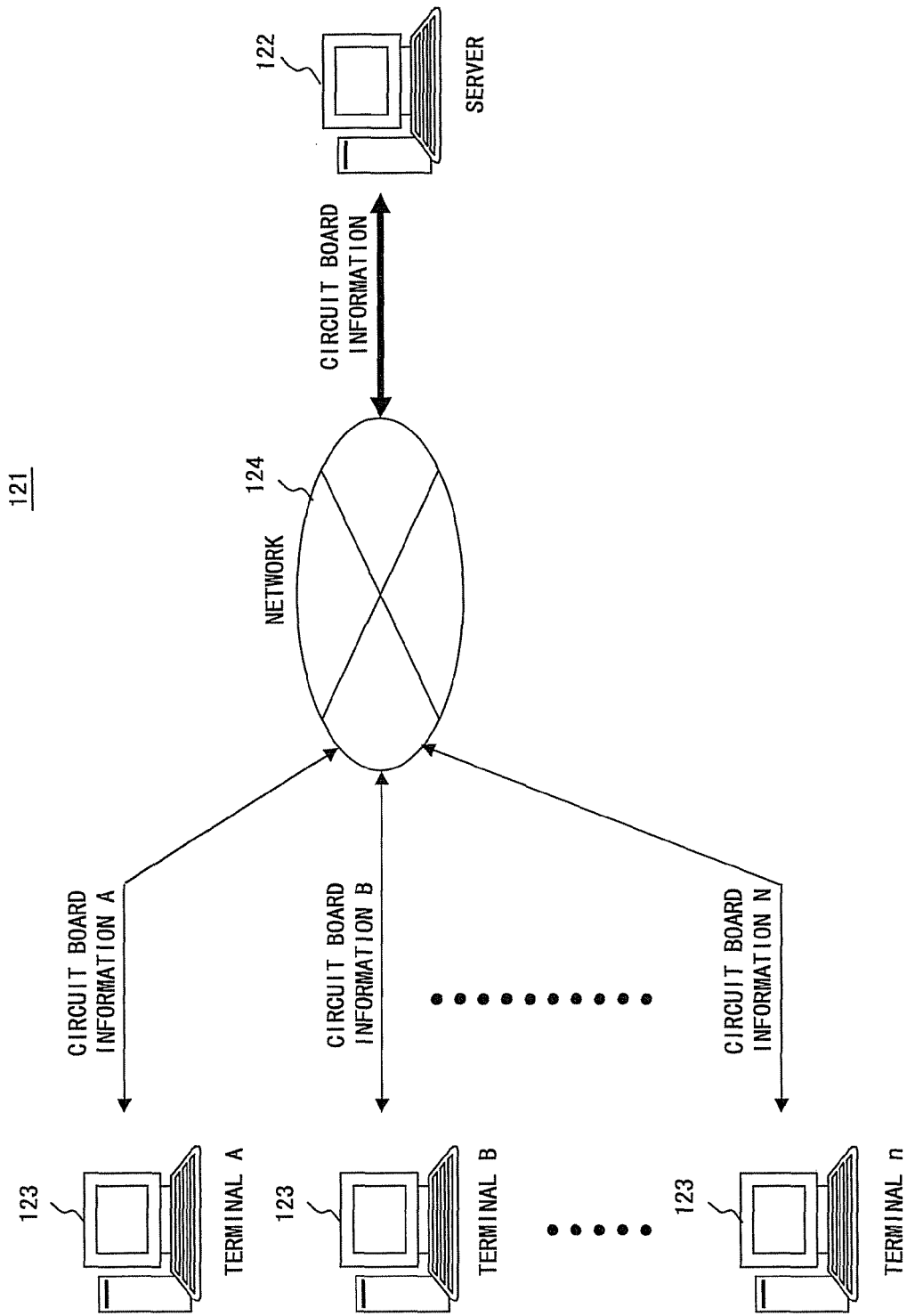
FIG. 12 shows a thermal simulation system.

FIG. 12 shows a thermal simulation system. In the system 121, a server 122 and a plurality of terminals 123 are connected via a network 124.

In the case in which the circuit board information acquisition and conversion (simplification of the thermal analysis model) explained in the above examples is performed, the respective terminals may separately perform the circuit board information acquisition and conversion. It is also possible to perform the circuit board information acquisition and conversion by accessing the server 122 from the terminal 123 and acquiring necessary information.

The above circuit board information acquisition and conversion may be realized as software, i.e., as a program executed by electronic devices (computers) such as the server 122, and the terminals 123 in the system 121. Also, this may be realized by hardware. Further, this can be realized as firmware that is software fixedly incorporated into computers of electronic devices and the like.

Also, the above processes can be performed in the configuration in which a prescribed program including the operations and steps described in the above examples is recorded in memory units (ROM or the like), and the program is written, by using an external personal computer or the like, to the computer (that includes a CPU and an information processing device) that is included in the device upon its activation.

The configuration is also possible in which a simplex computer (that includes a CPU and an information processing device such as FPGA) is used to record in memory units (ROM and the like) a prescribed program with the steps described in the above examples as a source, and the program is written to the computer upon its activation in order to perform the above steps.

The present invention can also be realized by the configuration in which a control program is produced for causing a commonly used computer CPU to execute the processes in the above described flowcharts, the program is recorded in a computer readable recording medium, the computer reads the program from the recording medium, and the CPU executes the program.

Figure 13:
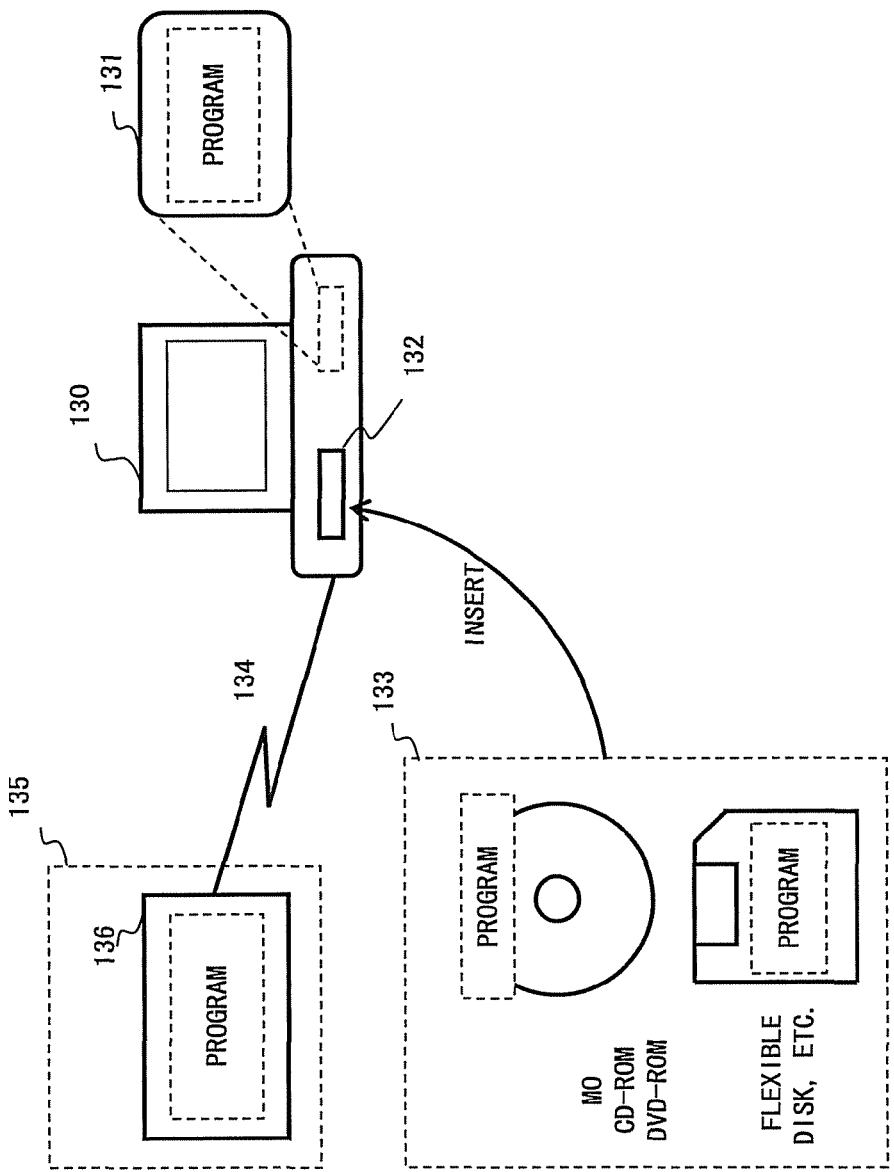
FIG. 13 shows a recording medium from which a control program recorded therein can be read by a computer system.

FIG. 13 shows an example of a recording medium from which a computer system can read control programs recorded in the medium. A recording medium 131 such as ROM or a hard disk that is included in the computer system 130 or that is used as an external device, or a transportable recording medium 134 such as a flexible disk, an MO (magneto optical disk), CD-ROM, or DVD-ROM from which the recorded control program can be read when the medium is inserted into a media driving device 132 included in the computer system 130 can be used as the recording medium.

Also, the recording medium can be a recording device 136 included in a computer system functioning as a program server 135 that is connected to the computer system 130 via a communications line 134. In this case, transmission signals obtained by modulating a carrier wave on the basis of data signals expressing the control program are transmitted to the computer system 130 from a program server 135 through the communications line 134 functioning as a transmission medium, and the computer system 130 demodulates the received transmission signals and reproduces the control program; thereby, this control program can be performed by the CPU on the computer system 130.

Also, the scope of the present invention is not limited to the above embodiments, and various modifications and alterations are allowed without departing from the spirit of the present invention.

What is claimed is:

1. A circuit board information acquisition and conversion method, comprising:
    a circuit board design information acquisition process acquiring circuit board design information including via hole information that includes a via hole dimension, a via hole position and a via hole thermal conductivity for each via hole of a plurality of via holes in heat propagation paths in a circuit board, the circuit board design information acquisition process being performed by a computer;
    a merger determination process calculating distances between via holes in a circuit board model using the via hole information of the circuit board design information and performing merger determination of whether or not the plurality of via holes are to be merged to become one via hole in the circuit board model using the calculated distances; and
    an analysis model conversion process merging the plurality of via holes to become one via hole in the circuit board model using the circuit board design information and a result of the merger determination, determining a thermal conductivity value of the merged via holes using a value of the thermal conductivity of each of the via holes before being merged to become one via hole, and creating a thermal analysis model using the one via hole.

2. The circuit board information acquisition and conversion method according to claim 1, wherein
    the circuit board design information is stored in the computer and further includes layer configuration information and wire trace information of the circuit board is acquired in the circuit board design information acquisition process, and
    during the merger determination process, the calculated distance is compared with a connection determination value and, when the calculated distance is within a certain range of the connection determination value, the plurality of via holes with the calculated distance being within the range are determined to be merged to become one via hole.

3. The circuit board information acquisition and conversion method according to claim 2, wherein:
    the merger determination is performed by setting ranges of the connection determination value for each of the same layer; or
    the merger determination is performed by setting ranges of the connection determination value for each layer in the circuit board.

4. The circuit board information acquisition and conversion method according to claim 2, further comprising:
    a circuit board design information analysis process acquiring package information and heat information corresponding to mounted components in mounted component information included in the circuit board design information; and
    a heat density determination process beforehand setting a heat density determination value, calculating heat density from the heat amount of each of the mounted components, comparing the calculated heat density with the heat density determination value, changing circuit board design information in such a manner so as to cause the via holes to be arranged within an area of the circuit board that has a heat density that is equal to or greater than the heat density determination value, and deciding not to arrange the via holes when the calculated heat density is out of a range of the heat density determination value.

5. The circuit board information acquisition and conversion method according to claim 4, wherein:
    the analysis model circuit board is divided into a plurality of regions, a heat density determination value and an inside-region heat density difference determination value are set for each of region of the divided plurality of regions beforehand,
    heat density is calculated from the heat amount for each of the mounted components within each region, the calculated heat density is compared with the heat density determination value, the circuit board design information is changed in such a manner so as to cause the via holes to be arranged in the region when the calculated heat density is equal to or greater than the heat density determination value that shows a high heat density region, and to cause the via holes to not be arranged in the region when the calculated heat density is lower than the heat density determination value that shows a low heat density region, and
    a difference between the calculated heat density of each region and the heat density determination value is calculated, the calculated difference is compared with the inside-region heat density difference determination value, the circuit board design information is changed in such a manner so as to cause the via holes are arranged when the calculated difference is equal to or greater than the inside-region heat density difference determination value that shows a high heat density region, and to cause the via holes to not be arranged in the region when the calculated difference is lower than the inside-region heat density difference determination value that shows a low heat density region.

6. The circuit board information acquisition and conversion method according to claim 2, wherein:
    resins and wire traces are combined on the basis of the layer configuration information and the wire trace information in the circuit board design information, and conversion providing an equivalent thermal conductivity as a physical property value of the resin and the wire traces before being combined is performed in the analysis model conversion process.

7. A circuit board information acquisition and conversion device, comprising:
    a circuit board design information input unit configured to acquire circuit board design information including layer configuration information, wire trace information and via hole information that includes a via hole dimension, a via hole position and a via hole thermal conductivity for each via hole of a plurality of via holes in heat propagation paths of a circuit board;
    a conversion information definition unit configured to calculate distances between the via holes in a circuit board model using the via hole information, and to compare the calculated distances with a connection determination value that is set beforehand in a memory unit, so that the plurality of via holes with the calculated distances being within a range are determined to be merged to become one via hole when the calculated distances between the via holes is within the range of the connection determination value; and
    an analysis model conversion unit configured to merge the via holes to become one via hole in the circuit board model using the circuit board design information and a result of the merger determination, to determine a thermal conductivity value of the merged via holes using a value of the thermal conductivity of each of the plurality of via holes before being merged to become one via hole, and to create a thermal analysis model using the one via hole.

8. The circuit board information acquisition and conversion device according to claim 7, wherein:
the conversion information definition unit performs the merger determination by setting ranges of the connection determination value for each of the same layer in the circuit board.

9. The circuit board information acquisition and conversion device according to claim 7, wherein:
the conversion information definition unit performs the merger determination by setting ranges of the connection determination value for each layer in the circuit board.

10. The circuit board information acquisition and conversion device according to claim 7, further comprising:
a circuit board design information analysis unit acquiring package information and heat information corresponding to mounted components in mounted component information included in the circuit board design information; and
a heat density determination unit beforehand setting a heat density determination value, calculating heat density from the heat amount of each of the mounted components, comparing the calculated heat density with the heat density determination value, changing circuit board design information in such a manner so as to cause the via holes to be arranged within an area of the circuit board that has a heat density that is equal to or greater than the heat density determination value, and deciding to not arrange the via holes when the calculated heat density is out of a range of the heat density determination value.

11. The circuit board information acquisition and conversion device according to claim 10, wherein:
the heat density determination unit divides the analysis model circuit board into a plurality of regions, sets a heat density determination value and an inside-region heat density difference determination value for each region of the divided plurality of regions, calculates heat density from the heat amount for each of the mounted components, compares the calculated heat density with the heat density determination value, changes the circuit board design information in such a manner so as to cause the via holes to be arranged in the region when the calculated heat density is equal to or greater than the heat density determination value that shows a high heat density region, and to cause the via holes to not be arranged in the region when the calculated heat density is lower than the heat density determination value that shows a low heat density region, and
calculates a difference between the calculated heat density of each region and the heat density determination value, compares the calculated difference with the inside-region heat density difference determination value, and changes the circuit board design information in such a manner so as to cause the via holes are arranged when the calculated difference is equal to or greater than the inside-region heat density difference determination value that shows a high heat density region, and to cause the via holes to not be arranged in the region when the calculated difference is lower than the inside-region heat density difference determination value that shows a low heat density region.

12. The circuit board information acquisition and conversion device according to claim 7, wherein:
the analysis model conversion unit combines resin and wire traces using the layer configuration information and the wire trace information in the circuit board design information, and performs conversion providing an equivalent thermal conductivity as a physical property value of the resin and the wire traces before being combined.

13. A computer readable recording medium in which a circuit board information acquisition and conversion program is recorded for executing a circuit board information acquisition and conversion processes for creating an analysis model by acquiring circuit board design information including layer configuration information, wire trace information and via hole information that includes a via hole dimension, a via hole position and a via hole thermal conductivity for each via hole of a plurality of via holes in heat propagation paths of the circuit board, the program causing a computer to execute:
a conversion information definition process calculating distances between the via holes using the via hole information, comparing the calculated distances with a connection determination value that is set beforehand in a memory unit, the plurality of via holes with the calculated distances being within a range are determined to be merged to become one via hole when the calculated distances are within the range of the connection determination value; and
an analysis model conversion process merging the via holes to become one via hole in the circuit board model using the circuit board design information and a result of the merger determination, determining a thermal conductivity value of the merged via holes using a value of the via hole thermal conductivity of each of the plurality of via holes before being merged to become one via hole, and creating a thermal analysis model using the one via hole.

14. The computer readable recording medium according to claim 13, wherein the program causes a computer to execute the circuit board information acquisition and conversion program according to claim 13, in which:
the conversion information definition process sets a range of the connection determination value for each of the same layer of the circuit board, and the merger determination is performed.

15. The computer readable recording medium according to claim 13, wherein the program causes a computer to execute the circuit board information acquisition and conversion program according to claim 13, in which:
the conversion information definition process sets a range of the connection determination value for each layer of the circuit board, and the merger determination is performed.

16. The computer readable recording medium according to claim 13, wherein the program causes the computer to execute the circuit board information acquisition and conversion program according to claim 13, in which the program includes:
a circuit board design information analysis process acquiring package information and heat information corresponding to mounted components in mounted component information included in the circuit board design information; and a heat density determination process beforehand setting a heat density determination value, calculating heat density from heat amount of each of the mounted components, comparing the calculated heat density with the heat density determination value, changing circuit board design information in such a manner so as to cause the via holes to be arranged in an area of the circuit board that has a heat density that is equal to or greater than the heat density determination value, and deciding not to arrange the via holes when the calculated heat density is out of a range of the heat density determination value.

17. The computer readable recording medium according to claim 16, wherein the program causes the computer to execute the circuit board information acquisition and conversion program according to claim 13, in which the program includes:

a heat density determination process dividing the analysis model circuit board into a plurality of regions, beforehand setting a heat density determination value and an inside-region heat density difference determination value for each of region of the divided plurality of regions, calculating heat density from the heat amount of each of the mounted components, comparing calculated heat density with the heat density determination value, changing the circuit board design information in such a manner so as to cause the via holes to be arranged in the region when the calculated heat density is equal to or greater than the heat density determination value, and deciding not to arrange the via holes in the region when the calculated heat density is lower than the heat density determination value that shows a low heat density region, and calculating a difference between the calculated heat density of each region and the heat density determination value, comparing the calculated difference with the inside-region heat density difference determination value, changing the circuit board design information in such a manner so as to cause the via holes are arranged when the calculated difference is equal to or greater than the inside-region heat density difference determination value that shows a high heat density region, and deciding not to arrange the via holes in the region when the calculated difference is lower than the inside-region heat density difference determination value that shows a low heat density region.

* * * * *